June 8, 1948. W. H. PARMELEE 2,443,053
METHOD OF AND APPARATUS FOR MANUFACTURING HOLLOW PLASTIC ARTICLES
Filed March 20, 1943 2 Sheets-Sheet 1
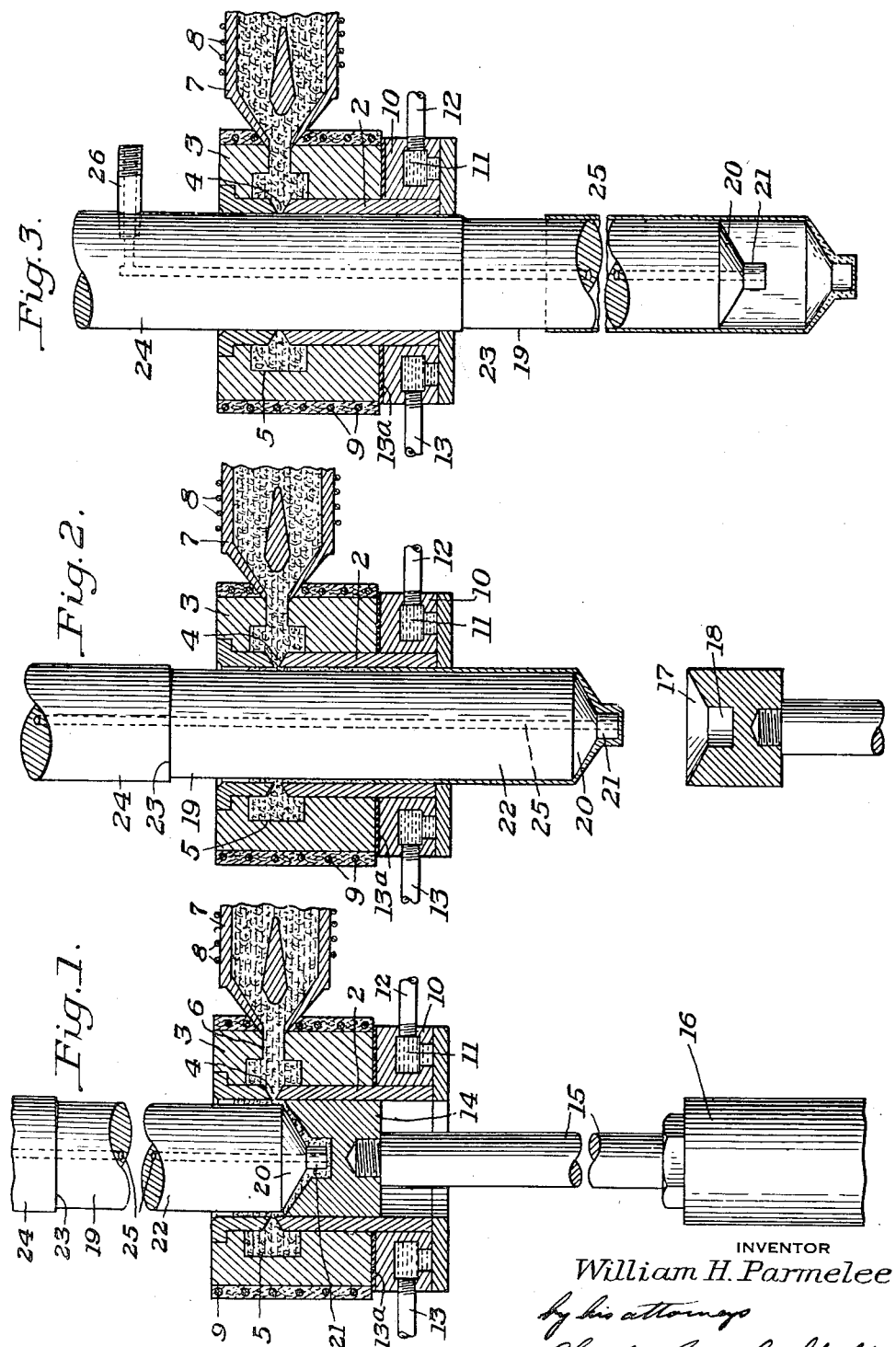
INVENTOR
William H. Parmelee
by his attorneys
Christy, Parmelee-Strickland

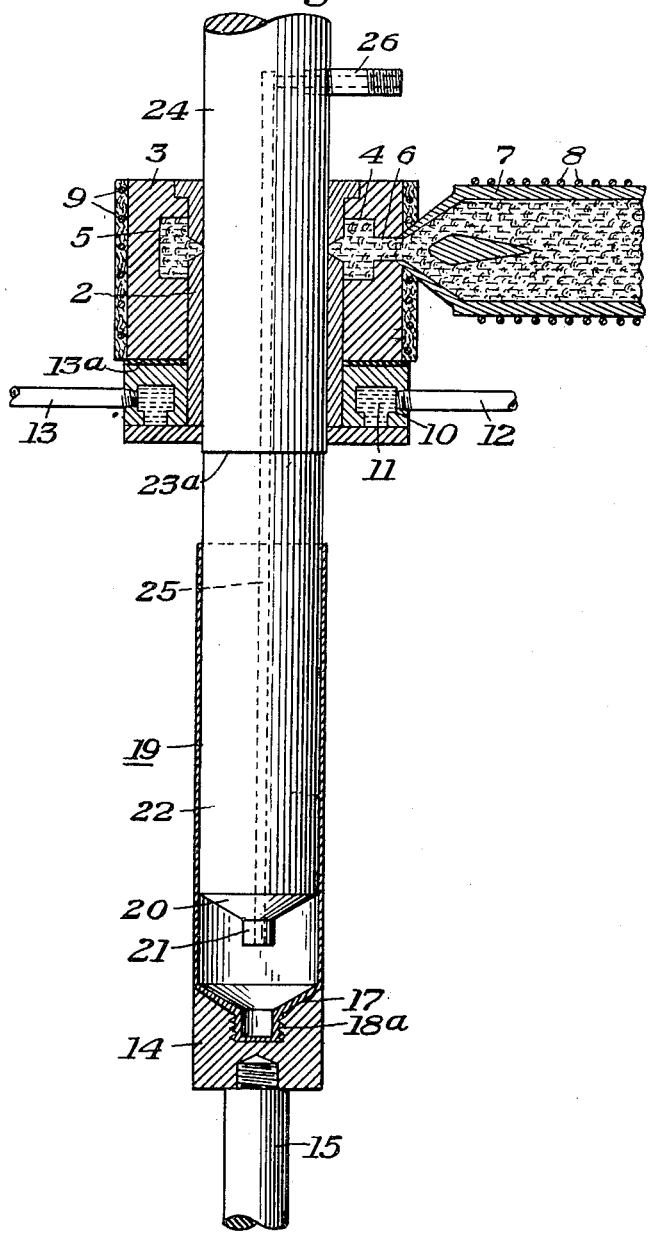

Patented June 8, 1948

2,443,053

UNITED STATES PATENT OFFICE 2,443,053

METHOD OF AND APPARATUS FOR MANUFACTURING HOLLOW PLASTIC ARTICLES

William H. Parmelee, Bethel Township, Allegheny County, Pa., assignor to Wheeling Stamping Company, Wheeling, W. Va., a corporation of West Virginia Application March 20, 1943, Serial No. 479,871

28 Claims. (Cl. 18—14)

This invention pertains to the manufacture of thin walled hollow plastic articles, particularly those having portions which are of different wall thickness, such, for example, as collapsible tubes of the type commonly employed for toothpaste, cosmetics, and the like.

Various methods have heretofore been proposed for the manufacture of articles of this kind, but with indifferent success. The conventional form of collapsible tube has side walls of quite thin, flexible wall section, while the shoulder at the neck end of the tube is relatively thicker to resist distortion, and the tubulation constituting the neck must be sufficiently heavy to carry a thread for holding a removable cap in sealing engagement with the end of the tube.

The formation of these tubes by molding has not proven satisfactory because of the difficulty of forcing the plastic material into a mold cavity sufficiently thin to produce the side wall portion of the tube. Tubes have been formed by dipping a mandrel into a plastic solution, but unless the neck end of the tube is repeatedly dipped, the whole tube will be of uniformly thin wall section. Moreover, the evaporation of solvent from the thin wall section is likely to leave open capillaries that permit the evaporation or escape of essential oils. Methods of extrusion used for the production of metal tubes, such as lead, tin, and aluminum tubes, are not satisfactory because plastic resins having the extrudable qualities of the soft metals have not been developed. Commercially, the most satisfactory tubes are formed by cementing together or uniting separately formed tube and wall parts, which is relatively expensive, and the tubes have certain weaknesses.

The flexible resins or plastics adaptable for use in collapsible tubes are thermoplastic materials, and as such lend themselves very well to methods of injection molding where the heat-softened plastic compound is forced from a cylinder under great pressure through a restricted orifice into a mold cavity.

In carrying out the present invention, collapsible tubes and like hollow bodies are formed as integral articles, in conventional or other shapes, by a combination of operations utilizing the injection method of molding in conjunction with the formation of the head and neck portion of the tube by what may be termed a kind of compression molding, and the side wall part of the tube by a combination of injection and extrusion operations. Plastic material forced from the chamber of an injection molding apparatus enters the interior of a hollow sleeve through a restricted, substantially annular opening between the top and bottom of the sleeve. The material first entering the sleeve is collected in a mold member having a working fit in the sleeve. A plunger, entering the opposite end of the sleeve, compresses or shapes the material to form the heavy end and neck of the article. The plunger is of slightly less diameter than the inside of the sleeve, the difference determining the wall thickness. After forming the end portion of the article, the plunger moves through the sleeve, the mold member moving with it, and material being forced into the sleeve around the plunger is carried along with the movement of the plunger, to progressively form the side wall portion of the article. When the article has been formed to its full length, an enlargement on the plunger closes the port in the sleeve and the plunger continues to move through the sleeve until the shoulder approaches the end of the sleeve. By this time the plastic has been cooled and has set, and the completed article may be stripped from the forming mandrel.

My invention may be fully understood by reference to the accompanying drawings, which are to be considered as more or less schematic and which illustrate the manufacture of a collapsible tube of conventional form, and in which:

Figure 1 is a vertical section through a machine embodying my invention with the parts in the position which they occupy near the beginning of the forming operation;

Figure 2 is a similar view after the forming operation has progressed further;

Figure 3 is a similar view, showing the position of the parts after the operation has been completed and the stripping of the finished article has started;

Figure 4 is a view similar to Figure 3, showing a slightly modified construction.

The apparatus, as disclosed in the drawings, comprises a forming sleeve 2 within an enclosing member 3. The sleeve 2 has an inside diameter which is equal to the outside diameter of the article which is to be formed. The sleeve is provided intermediate its ends with a restricted annular port or opening 4. This opening may be continuous or may comprise a series of closely spaced slots or holes forming, in effect, a continuous opening. In the body 3 surrounding the opening 4 is an annular chamber 5. There is a passageway 6 communicating with this chamber. At 7 there is designated the discharge terminal of the cylinder, similar to that used in injection molding, and which is of a construction well known to those skilled in the art. This cylinder, as is well understood in the art, is provided with a piston, not shown, and it is provided with heating means, indicated at 8, for heating the plastic charge within the cylinder. The heated material from the terminal 7 of the cylinder is forced under pressure into the passageway 6 and around the annular chamber 5.

Means are provided around the body 3 for heating the same. The drawings illustrate an electric heater 9 around the body. The lower end of the sleeve 2 projects through a second annular ring or body 10, having an annular passageway 11 therein, through which a cooling fluid may be circulated, a fluid inlet connection being indicated at 12 and a fluid outlet connection being indicated at 13. A disk thermal insulation 13a may be interposed between the heated body 3 and the cooled annulus 10.

For cooperation with the sleeve 2 there is provided a lower mold member 14, which has a close working fit in the sleeve 2 and which is carried on a piston rod 15, which is operated by a hydraulic cylinder or ram 16. In the top of the lower mold member 14 is a cavity 17, the shape of which conforms to the exterior shape of the article to be produced. In the case of a collapsible tube the recess 17 has a center well, the recess and well being designed to form the exterior of the shoulder and neck of the tube, respectively.

Entering the sleeve 2 from the opposite end thereof is a plunger designated generally as 19, and which is operated by a hydraulic ram or press, not shown. The plunger 19 has a lower terminal portion 20, which is shaped to conform to the inner end of the article which is to be produced. As shown in the drawing, this end of the plunger is of conical form and has a central nipple 21 thereon, the central nipple being designed to form the inside passage in the neck of the tube. Above the terminal portion 20 the plunger has a portion 22, the exterior diameter of which is slightly less than the interior diameter of the sleeve, the difference in the two diameters being equal to the wall thickness of the article which is to be produced. The part 22 of the plunger is of a length equal at least to the length of the article which is to be formed, and at the top of the portion 22 there is an annular shoulder 23. Above the shoulder 23 the portion 24 of the plunger is of substantially the same diameter as the inside diameter of the sleeve 2, so that it has a close working fit within this sleeve.

The plunger unit 19 has a central longitudinally extending passageway 25 therethrough, which opens through the end of the nipple 21 at the lower end of the plunger. Above the shoulder 23 there is a laterally extending nipple 26, through which air under pressure may be delivered to the passage 25.

Assuming the machine to be operating, with the parts at the proper operating temperature, the cycle of operation is as follows: The lower mold member 14 is raised to approximately the position shown in Figure 1, while the plunger 19 is slightly above the position shown in Figure 1. Plastic material under pressure is injected through the restricted port 4 into the bottom mold member. When sufficient material has been injected to form the lower end portion of the article, the plunger 19 lowers to the position shown in Figure 1, molding under pressure the lower end of the collapsible tube or other article to be produced. When the pressure on the plunger 19 exceeds the pressure exerted by the ram 16, the lower mold member 14 will start to move downwardly, as will also the upper plunger, the two parts moving at the same rate of speed. This will carry the formed end of the article downwardly. Plastic material under pressure will continue to be injected from the port 4 into the space around the plunger 22, forming about the plunger the side wall of the article. The side wall is thus progressively formed as the plunger moves downwardly, avoiding the difficulty of causing the plastic material to flow to any extent in the very thin cavity. In other words the progressive formation of the side wall of the tube avoids the difficulty heretofore encountered of trying to force the plastic material into the confines of a very thin mold cavity. As the formation of the tube progresses, the formed plastic is carried into contact with the cooled lower end of the sleeve, causing the plastic to solidify. Also, if desired, the downward movement of the lower mold member 14 may be accelerated so as to drop out of the way of the lower end of the plunger. The plunger unit 19 continues its downward movement, progressively forming the side wall of the tube in the manner described, until the shoulder 23 moves across the annular port 4. At this instant the injection of further plastic material is cut off, but the plastic material, being in the heated body 3, cannot solidify. The plunger 19 continues its downward movement until the shoulder 23 reaches the bottom end of the sleeve, which is the position shown in Figure 3. At this time all of the side wall portion of the article will have been cooled and taken a permanent set. When the parts are in this position, air under pressure is admitted through the nipple 26 into the central passage 25, and the pressure of the air against the inside of the formed article will blow the formed article off the plunger, thus completing the operation. At the time that the formed article is blown off the plunger, the lower mold member 14 will have been dropped sufficiently below the end of the plunger 19 to allow the tube to be stripped in this way.

After the tube has been stripped from the forming plunger, the plunger 19 is retracted. During the retracting movement the pressure in the injection cylinder 7 is relieved so that when, on the upward movement of the plunger, the shoulder 23 again clears the port 4, the plastic material will not squirt out around the plunger until the parts have reached the starting point in the cycle.

From the foregoing description it will be seen that the forming operation is essentially one of injection molding, in which the heated thermoplastic material is forced in a heated condition under heavy pressure through a restricted passageway into a mold cavity. However, at the beginning of the cycle the operation also contains the initial step of compression molding for effectively shaping the thick end portion of the article. Also, the movement of the plunger inside the sleeve, forming the side wall of the article, combines with the operation of injection molding the method of extrusion. The mass of the lower mold member 14 is such that it can be heated and cooled, if necessary, to the desired extent, and at a feasible rate of operation, although means for heating the member 17 during its upward travel have not specifically been disclosed. Various thermoplastic molding materials may be used, as, for example, plasticized vinyl-chloride, and some of the other vinyl molding compounds, as well as cellulose plastics, such as cellulose acetate, cellulose nitrate, or ethyl cellulose, or such other plastics as may suit themselves to the article which is to be formed.

With some materials the formed tube may cling too tightly to the forming plunger to permit it to be completely removed by air pressure. Where this condition is encountered, the modification shown in Figure 4 may be employed, particularly for the formation of collapsible tubes and other articles which may have a threaded terminal. In the modification shown in Figure 4 the parts are essentially the same as previously described, except that the well 18 in the lower mold member carries an internal thread 18a. The thread on the neck of the collapsible tube to receive the cap may thus be formed in the same operation that results in the forming of the tube. With this modification the lower mold member moves downwardly with the plunger, and at the same rate as the plunger, until the article has been completely formed. Then, with the plunger stationary, the lower mold member 18 continues its downward movement. The tube, being threaded to the lower mold member, will be mechanically pulled down off the forming plunger. Air may or may not also be used, as may be found desirable. After the tube has been stripped from the forming plunger, it may be manually unscrewed or otherwise released from the lower mold member 14.

It may be observed in Figures 1 and 2 that the annular space between the plunger and the sleeve is open at the top until such time as the shoulder 23 closes this space. Due, however, to the resistance to flow of the material in a very thin space, the rate of movement of the plunger, and the rate of injection of material, the plastic material will not flow out this open top of the sleeve.

While I have described my invention particularly as pertaining to the manufacture of collapsible tubes it will be understood that it is not confined to the production of such articles, but can be applied to the production of various tubular articles from thermoplastic materials, and especially articles having a heavy end wall section and a very thin side wall section. An additional advantage of my invention is that the waste of material due to the formation of screws, which is necessary with ordinary methods of injection molding, is entirely eliminated with the present invention by reason of the fact that the shoulder 23 on the forming plunger cuts off the inflowing material and there is no screw formed. The drawings illustrate the essential parts of the method and apparatus. The hydraulic cylinders and their controls are well known to those skilled in the art and have not been shown. Various changes and modifications may be made in the apparatus to suit the particular conditions of operation and the specific article being formed. And it is also apparent that the apparatus may be arranged in multiple units to enable more than a single article to be formed at one time.

I claim as my invention:

1. The method of making a hollow plastic article having an end wall at one end thereof and having an integral substantially tubular side wall portion, which comprises injecting heated plastic material between two spaced forming members within a molding chamber to produce the end wall portion of the article, and then moving the forming members axially through the chamber to the exterior thereof and continuing to inject additional plastic material into the chamber about one of the forming members as said forming members continue to move to form the tubular side wall portion of the article.

2. Apparatus of the class described for forming a tubular plastic article comprising a molding sleeve a plunger in the sleeve of very slightly less diameter than the sleeve and defining a very narrow annular space between itself and sleeve corresponds in the thickness to the thickness of a thin-walled collapsible tube, said sleeve and plunger being movable relatively to each other in an axial direction, means for injecting molten plastic material into the sleeve about the plunger under pressure, and a complementary mold member movable with the plunger in an axial direction relatively to the sleeve, cooperating with said plunger for forming the end wall of a hollow article.

3. Apparatus of the class described for making hollow plastic articles comprising a forming sleeve having a substantially annular restricted passageway therethrough, means surrounding the sleeve forming a channel for plastic material, means for supplying heated plastic material under pressure to said channel whereby it may flow from said channel through the substantially annular passageway, and a plunger having a forming portion which is of very slightly less diameter than the interior of the sleeve and defining between itself and sleeve a very narrow annular chamber corresponding in thickness to the thickness of a thin-walled collapsible tube, said plunger being movable through the sleeve, the plunger also having a cut-off portion adapted to interrupt supply of plastic material through the channel responsively to predetermined movement of the plunger through the sleeve.

4. Apparatus of the class described for making hollow plastic articles composed of thermoplastic synthetic resin, comprising a forming sleeve having a substantially annular restricted passageway therethrough, means surrounding the sleeve forming a channel for molten plastic material, means for supplying molten plastic material under pressure to said channel whereby it may flow from said channel through the substantially annular passageway, and a plunger having a forming portion which is of very slightly less diameter than the interior of the sleeve and defining between itself and sleeve a very narrow annular space corresponding to the thickness of a thin-walled collapsible tube, said plunger being movable through the sleeve and having a portion above the forming portion which is of substantially the same diameter as the inside of the sleeve for closing the passageway when the plunger has moved a predetermined distance.

5. Apparatus of the class described for making hollow plastic articles comprising a forming sleeve having a substantially annular restricted passageway therethrough, means surrounding the sleeve forming a channel for plastic material, means for supplying heated plastic material under pressure to said channel whereby it may flow from said channel through the substantially annular passageway, a plunger having a formin portion which is of less diameter than the interior of the sleeve, said plunger being movable through the sleeve and having a portion adjacent to the forming portion which is of substantially the same diameter as the inside of the sleeve, and a mold member movable into and out of the sleeve for cooperation with the plunger for forming an end wall of the hollow article.

6. Apparatus of the class described for making hollow plastic articles comprising a forming sleeve having a substantially annular restricted passageway therethrough, means surrounding the sleeve about the passageway forming a channel for plastic material, means for supplying heated plastic material under pressure to said channel whereby it may flow from said channel through the substantially annular passageway, a plunger movable axially through the sleeve having a forming portion which is of less diameter than the interior of the sleeve, means for heating the sleeve in the region of said channel, and means for cooling the sleeve beyond the heated region, a mold member entered into the sleeve from the cooled end thereof, and a hydraulic ram for operating said mold member.

7. Apparatus for forming collapsible tubes and the like having a relatively thick end wall section and a relatively thin side wall section comprising a forming sleeve, a mold member having a working fit in the sleeve and movable into and out of the sleeve, means for operating the mold member, a plunger having a forming portion which is of slightly less diameter than the interior diameter of the sleeve, said plunger being movable axially through the sleeve, and means for pressure-injecting a molten thermoplastic molding compound through the walls of the sleeve, the said plunger defining between itself and sleeve a narrow annular space adapted to receive molten molding compound and being of an internal diameter corresponding to the thickness of a thin-walled collapsible tube.

8. Apparatus for forming collapsible tubes and the like having a relatively thick end wall section and a relatively thin side wall section comprising a forming sleeve, a mold member having a working fit in the sleeve and movable into and out of the sleeve, means for operating the mold member, a vertically disposed plunger having a forming portion which is of slightly less diameter than the interior diameter of the sleeve, said plunger being downwardly movable axially through the sleeve during molding and being opposed to the mold member, means for injecting a thermoplastic molding compound through the walls of the sleeve, said plunger having a portion upwardly from the forming portion thereof which is of a diameter substantially the same as the interior diameter of the sleeve, for cutting off the injection of plastic into the sleeve.

9. Apparatus for forming collapsible tubes and the like having a relatively thick end wall section and a relatively thin side wall section comprising a forming sleeve, a mold member having a working fit in the sleeve and movable into and out of the sleeve at the lower end thereof, means for operating the mold member, a vertically disposed plunger entering the sleeve opposite the mold member having a forming portion which is of slightly less diameter than the interior diameter of the sleeve, said plunger being downwardly movable axially through the sleeve during molding, means for injecting a thermoplastic molding compound through the walls of the sleeve, said plunger having a portion upwardly from the forming portion thereof which is of a diameter substantially the same as the interior diameter of the sleeve for cutting off the injection of plastic into the sleeve, and means for heating the upper part of the sleeve and means for cooling the lower part of the sleeve.

10. Apparatus for forming collapsible tubes and the like having a relatively thick end wall section and a relatively thin side wall section comprising a forming sleeve, a mold member having a working fit in the sleeve and movable into and out of the sleeve at the lower end thereof, means for operating the mold member, a vertically disposed plunger entering the sleeve opposite the mold member having a forming portion which is of slightly less diameter than the interior diameter of the sleeve, said plunger being movable axially through the sleeve, means for injecting a thermoplastic molding compound through the walls of the sleeve, said plunger having a portion upwardly from the forming portion thereof which is of a diameter substantially the same as the interior diameter of the sleeve for cutting off the injection of plastic into the sleeve, said plunger having an axially extending passageway therethrough through which air may be admitted under pressure for removing the finished article from the plunger.

11. Apparatus for forming collapsible tubes and the like having a relatively thick end wall section and a relatively thin side wall section comprising a forming sleeve, a mold member having a working fit in the sleeve and movable into and out of the sleeve at the lower end thereof, means for operating the mold member, a vertically disposed plunger entering the sleeve opposite the mold member having a forming portion which is of slightly less diameter than the interior diameter of the sleeve, said plunger being downwardly movable axially through the sleeve during the molding, means for injecting a thermoplastic molding compound through the walls of the sleeve, said plunger having a portion upwardly from the forming portion thereof which is of a diameter substantially the same as the interior diameter of the sleeve for cutting off the injection of plastic into the sleeve, said mold member having a threaded cavity therein whereby the article being formed has threaded engagement with said mold member.

12. The method of forming a plastic tube composed of thermoplastic synthetic resin, which comprises positioning a pair of complementary forming members in a molding chamber with a space between the said members defining a mold cavity for molding an end wall of the plastic tube, the complementary forming members being axially movable through the said chambers, one of the forming members being slightly smaller in diameter than the complementary forming member and defining an annular space with the molding chamber for receiving molten plastic resin, maintaining the chamber at a temperature above the melting point of the resin, pressure-injecting molten resin in the space between the forming members, moving the forming members through the molding chamber until they move beyond the chamber while continuing to feed molten plastic resin to the chamber, thereby causing molten resin to enter the said annular space between the forming member and the chamber, the resin thereby flowing around said forming member to enclose and follow the said member, chilling the said resin below its melting point to solidify the resin in a zone remote from the forming chamber, and finally removing the resulting tube from its forming member.

13. The method of forming a hollow plastic article composed of a thermoplastic synthetic resin, the said article having an end wall at one end of the said article and having an integral tubular side wall portion which comprises pressure-injecting molten plastic resin into a mold cavity between complementary forming members operating in a molding chamber, the said forming members being movable axially of the chamber, thereby forming the said end wall of the article, moving the forming members through the mold chamber until the members pass out from the chamber while continuing to inject molten plastic resin into the chamber, maintaining the chamber at a temperature above the melting point of the plastic resin, thereby causing the resin to follow one of the forming members as it moves through the chamber, chilling the forming member and adhering resin in a zone remote from the forming chamber, thereby solidifying the resin around the forming member, and removing the resulting tubular plastic article from the forming member.

14. The method of forming a collapsible plastic tube composed of thermoplastic synthetic resin, which comprises positioning a pair of complementary forming members in a molding chamber with a space between the said members defining a mold cavity for molding an end wall of the plastic tube, the complementary forming members being axially movable through the said chamber, one of the forming members being slightly smaller in diameter than the complementary forming member and defining an annular space with the molding chamber for receiving molten plastic resin, maintaining the chamber at a temperature above the melting point of the resin, pressure-injecting molten resin in the space between the forming members, moving the forming members through the molding chamber until they move beyond the chamber while continuing to feed molten plastic resin to the molding chamber, thereby causing molten resin to enter the said annular space around the forming member of smaller diameter, the resin thereby flowing around said forming member to enclose and follow the said member during movement of the said member, chilling the said resin below its melting point to solidify the resin in a zone remote from the forming chamber, predeterminely valving off the flow of resin to the said chamber while continuing movement of the forming member, and finally removing the resulting tube from the forming member.

15. The method of making a plastic collapsible tube composed of thermoplastic synthetic resin, which comprises positioning a pair of complementary forming members in a molding chamber with a space between the said members defining a mold cavity for molding an end wall of the plastic tube, the complementary forming members being axially movable through the said chamber, one of the forming members being slightly smaller in diameter than the complementary forming member and defining an annular space with the molding chamber for receiving molten plastic resin, maintaining the chamber at a temperature above the melting point of the resin, pressure-injecting molten resin in the space between the forming members through the molding chamber until they move beyond the chamber while continuing to feed molten plastic resin to the chamber, thereby causing molten resin to enter the said annular space around the forming member of smaller diameter, the resin thereby flowing around the said forming member to enclose and follow the said member during movement of the said member, chilling the said resin below its melting point to solidify the resin in a zone remote from the forming chamber, predeterminedly interrupting the flow of resin to the forming chamber while continuing movement of the forming member, and finally removing the resulting tube from the said forming member by blowing compressed air axially through the said forming member to eject the tube therefrom.

16. The method of making a plastic collapsible tube composed of thermoplastic synthetic resin, which comprises positioning a pair of complementary forming members in a molding chamber with a space between the said members defining a mold cavity for molding an end wall of the plastic tube, the complementary forming members being axially movable through the said chamber, one of the forming members being slightly smaller in diameter than the complementary forming member and defining an annular space with the molding chamber for receiving molten plastic resin, maintaining the chamber at a temperature above the melting point of the resin, pressure-injecting molten resin into the mold cavity between the forming members, moving the forming members through the molding chamber until they move beyond the chamber while continuing to feed molten plastic resin to the said molding chamber and annular space, thereby causing molten resin to enter the said annular space around the forming member of smaller diameter, the resin thereby flowing around the said forming member to enclose and follow the said member during movement of the said member, thereby forming a continuous side wall of the tube integral with the said end wall, chilling the said resin to below its melting point to solidify the resin in a zone remote from the forming chamber predeterminedly valving off the flow of resin into the annular space while continuing movement of the forming members and responsively to the continued movement of the forming member of smaller diameter, and finally removing the resulting tube from the said forming member after the forming members have passed out from the said chamber.

17. The method of making a plastic collapsible tube composed of thermoplastic synthetic resin, which comprises positioning a pair of opposing complementary forming members in a molding chamber with a space between the said members defining a mold cavity for molding an end wall of the plastic tube, the complementary forming members being axially movable through the said chamber, one of the forming members being slightly smaller in diameter than the complementary forming member and defining an annular space with the molding chamber for receiving molding plastic resin, maintaining the chamber at a temperature above the melting point of the resin, pressure-injecting molten resin into the mold cavity between the forming members, moving the forming members through the molding chamber while continuing to feed molten plastic resin to the said molding chamber and annular space, thereby causing molten resin to enter the said annular space around the forming member of smaller diameter, the resin thereby flowing around the said forming member to enclose and follow the said member during movement of the said member, thereby forming a continuous side wall of the tube integral with the said end wall, chilling the said resin to below its melting point to solidify the resin in a zone remote from the forming chamber, thereby setting the side and end walls of the tube, predeterminedly valving off the flow of resin into the annular space while continuing movement of the forming members, and responsively to continued movement of the forming member of smaller diameter, restraining the end wall of the tube in the opposite forming member, continuing movement of the forming members until they both move beyond the chamber, then restraining the movement of the forming member of smaller diameter which carries the tube while continuing movement of the other forming member in which the end wall of the tube is restrained, thereby stripping the said tube from the forming member of smaller diameter, and finally releasing the stripped tube.

18. Apparatus for forming collapsible tubes composed of a thermoplastic synthetic resin, which comprises a molding chamber, instrumentalities for pressure-injecting molten plastic resin into the molding chamber, retaining means for the molding chamber, a pair of complementary forming members defining a mold cavity therebetween of a configuration corresponding to an end wall of the tube, the said forming members being substantially vertically disposed, one of the said members being an upper member of slightly smaller diameter than the molding chamber, and defining with the chamber a narrow annular space for receiving molten pressure-injected plastic, the said annular space communicating with the mold cavity between the forming members, the said forming members being movable together through the molding chamber until they reach a point beyond and below the chamber, whereby molten plastic material follows the forming members and encloses the upper of the said members, cooling means for the molding chamber for solidifying the plastic material in the mold cavity and annular space for producing integral end and side walls of the tube, and means for stripping the resulting tube from the said upper forming member.

19. Apparatus for forming collapsible tubes composed of a thermoplastic synthetic resin, which comprises a molding chamber, instrumentalities for pressure-injecting molten plastic resin into the molding chamber, retaining means for the molding chamber, a pair of complementary forming members defining a mold cavity between them of a configuration corresponding to an end wall of the tube, the said forming members being substantially vertically disposed, one of the said members being an upper member of slightly smaller diameter than the molding chamber, and defining with the molding chamber a narrow annular space for receiving molten pressure-injected plastic, the said annular space communicating with the mold cavity between the forming members and corresponding in diameter to the thickness of a thin-walled collapsible tube, the said forming members being movable together through the molding chamber until they reach a point beyond and below the chamber, the forming members being so moved while molten plastic material is being continued to be supplied by the pressure-injecting instrumentalities to the said annular space around the upper forming members, means in the retaining means for the molding chamber for keeping molten the plastic material in the molding chamber, annular space, and mold cavity between the forming members, whereby the upper forming member is surrounded and enclosed by molten plastic material which follows the said forming member as the said annular space elongates responsively to movement of the forming member, cooling means remote from the heating means for solidifying the said surrounding and enclosing plastic material for setting end and side walls of the tubes, and means on the upper forming member for automatically valving off the pressure-injecting instrumentalities responsively to movement of the forming members through a predetermined distance.

20. Apparatus for forming collapsible tubes having thin side walls and composed of a thermoplastic synthetic resin, which comprises a molding chamber, instrumentalities for pressure-injecting molten plastic resin into the molding chamber, retaining means for the molding chamber, a pair of complementary forming members defining a mold cavity between them of a configuration corresponding to an end wall of the tube including a discharge nipple for contents of the tube, the said forming member being substantially vertically disposed, one of the said members being an upper member of slightly smaller diameter than the molding chamber and defining with the molding chamber a narrow annular space for receiving molten pressure-injected plastic, the said annular space communicating with the mold cavity between the forming member and corresponding in diameter to the thickness of a thin-walled collapsible tube, the said forming members being independently movable together through the molding chamber until they reach a point beyond and below the chamber, the forming members being so moved while molten plastic material is being continued to be supplied by the pressure-injecting instrumentalities into the said annular space around the upper forming member, means in the molding chamber retaining means for keeping molten the plastic material in the molding chamber, the annular space, and the mold cavity between the forming members, whereby the upper forming member is substantially surrounded and enclosed by molten plastic material which follows the said forming member as the said annular space elongates responsively to movement of the forming member cooling means remote from the heating means for solidifying the said surrounding and enclosing plastic material for setting end and side walls of the tubes including the discharge nipple, the said upper forming member having an enlarged upper portion adapted to automatically valve off the molten resin-pressure-injecting instrumentalities responsively to movement of the forming members through a predetermined distance, and means for stripping the resulting tube from the upper forming member.

21. Apparatus for forming collapsible tubes having thin side walls and composed of a thermoplastic synthetic resin, which comprises a molding chamber, instrumentalities for pressure-injecting molten plastic resin into the molding chamber, retaining means for the molding chamber, a pair of complementary forming members defining a mold cavity between them of a configuration corresponding to an end wall of the tube including a discharge nipple for contents of the tube, the said forming member being substantially vertically disposed, one of the said members being an upper member of slightly smaller diameter than the molding chamber and defining with the molding chamber a narrow annular space for receiving molten pressure-injected plastic, the said annular space communicating with the mold cavity between the forming member and corresponding in diameter to the thickness of a thin-walled collapsible tube, the said forming members being independently movable together through the molding chamber until they reach a point beyond and below the chamber, the forming members being so moved while molten plastic material is being continued to be supplied by the pressure-injecting instrumentalities into the said annular space around the upper forming member, means in the molding chamber retaining means for keeping molten the plastic material in the molding chamber, the annular space, and the mold cavity between the forming members, whereby the upper forming member is substantially surrounded and enclosed by molten plastic material which follows the said forming member as the said annular space elongates responsively to movement of the forming member, cooling means remote from the heating means for solidifying the said surrounding and enclosing plastic material for setting end and side walls of the tubes including the discharge nipple, the said upper forming member having an enlarged upper portion adapted to automatically valve off the molten resin-pressure-injecting instrumentalities responsively to movement of the forming members through a predetermined distance, and means for stripping the resulting tube from the upper forming member, the said means comprising a passage extending longitudinally through the upper forming member for injecting compressed air behind the end wall of the tube for stripping the tube from the upper forming member.

22. Apparatus for forming collapsible tubes having thin side walls and composed of a thermoplastic synthetic resin, which comprises a molding chamber, instrumentalities for pressure-injecting molten plastic resin into the molding chamber, retaining means for the molding chamber, a pair of complementary forming members defining a mold cavity between them of a configuration corresponding to an end wall of the tube including a discharge nipple for contents of the tube, the said forming member being substantially vertically disposed, one of the said members being an upper member of slightly smaller diameter than the molding chamber and defining with the molding chamber a narrow annular space for receiving molten pressure-injected plastic, the said annular space communicating with the mold cavity between the forming member and corresponding in diameter to the thickness of a thin-walled collapsible tube, the said forming members being independently movable together through the molding chamber until they reach a point beyond and below the chamber, the forming members being so moved while molten plastic material is being continued to be supplied by the pressure-injecting instrumentalities into the said annular space around the upper forming member, means in the molding chamber retaining means for keeping molten the plastic material in the molding chamber, the annular space, and the mold cavity between the forming members, whereby the upper forming member is substantially surrounded and enclosed by molten plastic material which follows the said forming member as the said annular space elongates responsively to movement of the forming member cooling means remote from the heating means for solidifying the said surrounding and enclosing plastic material for setting end and side walls of the tubes including the discharge nipple, the said upper forming member having an enlarged upper portion adapted to automatically valve off the molten resin-pressure-injecting instrumentalities responsively to movement of the forming members through a predetermined distance, and means for stripping the resulting tube from the upper forming member, the said means including a threaded recess in the lower forming member for retaining the discharge nipple of the tube for stripping the tube from the upper forming member responsively to separating movement between the forming members.

23. The method of forming an article composed of a thermoplastic resin, the said article having an end wall at one end of the said article and having an integral tubular side wall portion, which comprises pressure-injecting molten plastic resin into a mold cavity between complementary forming members operating in a molding chamber, the said forming members being movable axially of the chamber thereby forming the said end wall of the article, moving the forming members through the mold chamber until the members pass out from the chamber while continuing to inject molten plastic resin into the chamber thereby causing the resin to follow one of the forming members as it moves through the chamber, chilling the forming member and accompanying resin in a zone spaced from the place where material is introduced into the molding chamber, thereby solidifying the resin around the forming member, and removing the resulting tubular plastic article from the forming member.

24. The method of forming a hollow plastic article composed of a thermoplastic resin, the said article having an end wall at one end of the said article and having an integral tubular side wall portion, which method comprises pressure-injecting molten plastic resin into a mold cavity surrounding a forming member operating in a molding chamber, the said forming member being movable axially of the chamber, moving the forming member through the mold chamber until the forming member passes out from the chamber while continuing to inject molten plastic resin into the chamber, thereby causing the resin to follow the forming member as it moves through the chamber, chilling the forming member and accompanying resin which follows along with it in a zone spaced from the place where the resin is introduced into the molding chamber, thereby solidifying the resin around the forming member, interrupting the supply of resin to the molding chamber responsively to predetermined movement of the forming member through the molding chamber and chilling zone, and removing the resulting tubular plastic article from the forming member.

25. The method of making hollow plastic articles composed of thermoplastic synthetic resin, which comprises injecting fluid thermoplastic resin under pressure about a mandrel moving longitudinally through a forming chamber, causing the fluid resin to enclose and follow the mandrel during movement thereof while continuing to so inject additional resin around the moving mandrel and automatically interrupting the injection of the resin responsively to predetermined movement of the said mandrel.

26. The method of making hollow plastic articles composed of thermoplastic resin, which comprises injecting heated fluid plastic material under pressure into a heated chamber maintained at a temperature sufficient to keep the resin in fluid condition through which chamber a forming member is moving in an axial direction, cooling the walls of the chamber beyond the zone of injection to below the solidifying temperature of the resin to solidify the resin surrounding the forming member while continuing to supply fluid resin to the said chamber, and automatically interrupting the supply of resin to the chamber responsively to movement of the forming member through a predetermined distance.

27. The method of making hollow plastic articles which comprises injecting fluid thermoplastic resin under heat and pressure into the space around a mandrel and inside a forming sleeve and while moving the mandrel relative to the sleeve while the material is being injected into the forming sleeve, thereby causing the resin to surround the mandrel and move therewith as the mandrel moves through the forming sleeve, interrupting the injection of the resin into the forming sleeve responsively to movement of the mandrel through a predetermined distance beyond the forming sleeve, and cooling the fluid plastic surrounding the mandrel until solidification of the plastic is effected as the mandrel carrying the plastic emerges from the forming sleeve.

28. Apparatus of the class described for forming a tubular plastic article comprising a molding sleeve, means for introducing plastic material into the sleeve, a plunger movable in the sleeve movable axially through the sleeve past said means for introducing plastic material into the sleeve, whereby plastic material may be forced around and along the moving plunger, and a mold member in the sleeve movable relatively to the plunger whereby compression forming of plastic material between the mold member and plunger may be effected.

WILLIAM H. PARMELEE.

REFERENCES CITED

The following references are of record in the file of this patent:

UNITED STATES PATENTS

| Number | Name | Date |
| --- | --- | --- |
| 1,211,370 | Price et al. | Jan. 2, 1917 |
| 1,370,800 | Egerton | Mar. 8, 1921 |
| 1,390,375 | Oppenhauser | Sept. 13, 1921 |
| 1,515,383 | Davis | Nov. 11, 1924 |
| 1,637,207 | Whitehouse | July 26, 1927 |
| 1,658,566 | MacDonald | Feb. 7, 1928 |
| 1,664,990 | Oehmig, Jr., et al. | Apr. 3, 1928 |
| 1,770,396 | Fuller et al. | July 15, 1930 |
| 2,175,053 | Ferngren | Oct. 3, 1939 |
| 2,262,612 | Kopitke | Nov. 11, 1941 |
| 2,288,454 | Hobson | June 30, 1942 |

FOREIGN PATENTS

| Number | Country | Date |
| --- | --- | --- |
| 38,669 | Netherlands | Aug. 15, 1936 |